United States Patent [19]

Layton

[11] 3,792,806

[45] Feb. 19, 1974

[54] CARRIER FOR TOBACCO PLANTS

[76] Inventor: Luke Layton, Mall Towers, Apt. 810, Atchison, Kans. 66002

[22] Filed: Sept. 11, 1972

[21] Appl. No.: 287,788

[52] U.S. Cl. .............................................. 224/49
[51] Int. Cl. ........................................... B65d 63/18
[58] Field of Search.........224/49, 45 N, 47; 294/74

[56] References Cited
UNITED STATES PATENTS

| | | | |
|---|---|---|---|
| 3,167,227 | 1/1965 | Walden | 224/49 |
| 926,364 | 6/1909 | Stowe | 224/49 |
| 1,559,046 | 10/1925 | McLeran | 224/49 |
| 2,564,293 | 8/1951 | Ammon | 224/47 |
| 1,121,566 | 12/1914 | McKee | 224/47 |
| 3,404,819 | 10/1968 | Rolph | 224/49 |

*Primary Examiner*—Gerald M. Forlenza
*Assistant Examiner*—Kenneth Noland
*Attorney, Agent, or Firm*—John A. Hamilton

[57] ABSTRACT

A carrier for tobacco plants consisting of a rectangular sheet of canvas adapted to be wrapped about a bundle of plants, strips of canvas secured to the sheet to reinforce it, and being extended in loops at the adjoining edges thereof to form carrying handles, and hooks adapted to connect the adjoining edges of the sheet releasably together.

1 Claim, 3 Drawing Figures

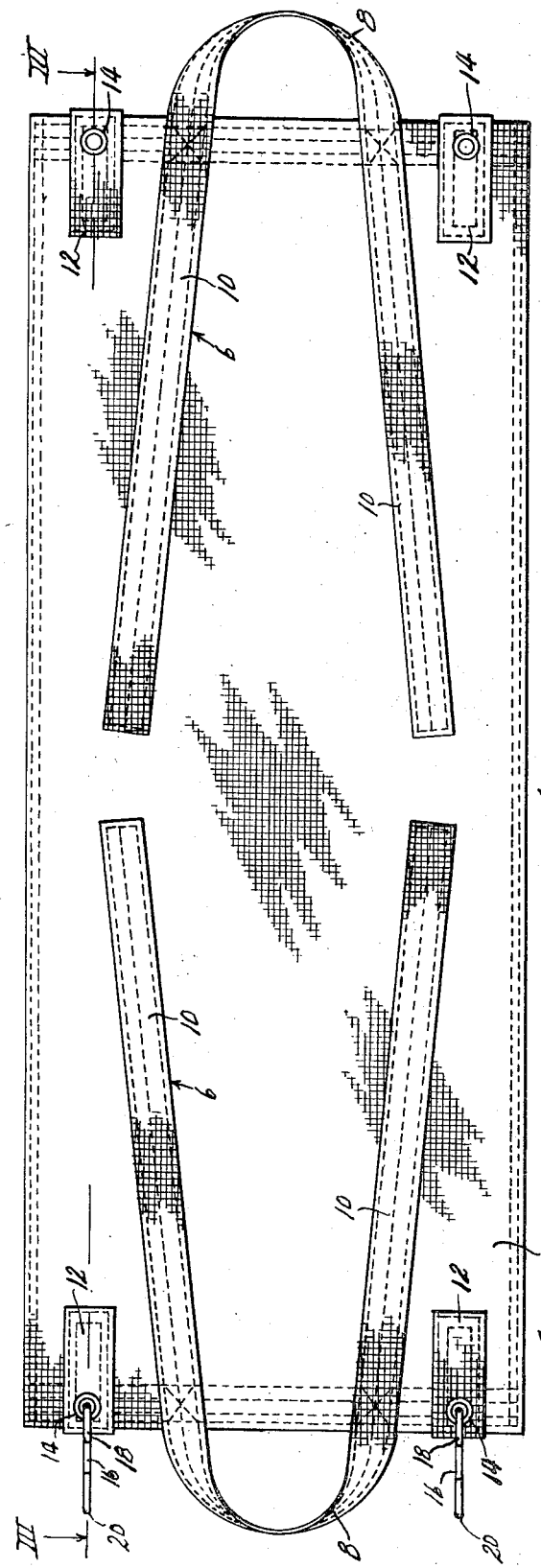
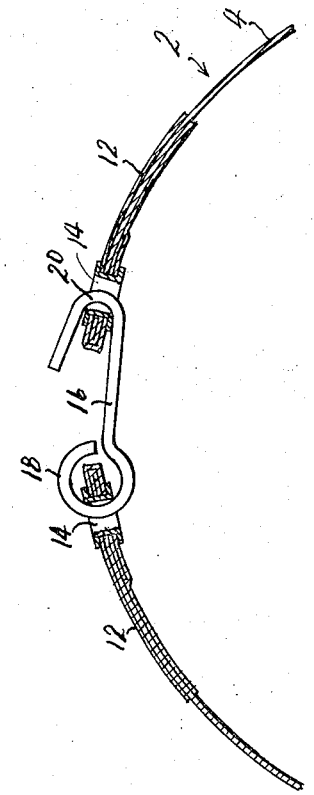

CARRIER FOR TOBACCO PLANTS

This invention relates to new and useful improvements in carriers for tobacco plants in the process of transplanting them. Young tobacco plants at the seedling stage, are transplanted into the field in which they will mature, at a suitable time of the year. In the transplanting procedure, the young plants are transported to the field in some sort of carrier and are planted in the soil of the field by hand, usually by workmen riding some sort of conveyance which moves along the prepared rows at a slow speed, each workman removing the plants one at a time from the carrier and placing the root end thereof in the ground. The principal object of the present invention is the provision of a carrier for use in this operation, by which the operation may be carried out very rapidly, easily and efficiently.

Among the features involved in carrying out the above object are the provision of a carrier which is of very light weight so that it does not add materially to the weight of the bundle of plants, which can be easily and conveniently carried, which may be formed of pliable cloth but which is reinforced for ample strength, which can be securely fastened about a bundle of plants to avoid accidental spillage thereof, and which can be set down and left unattended if necessary without spillage of the plants, which can be very easily released to provide access to the plants, and which is soft and pliable so that it can be easily and comfortably carried in the lap of an operator, or will conform to any suitable carrier holder, during the actual planting operation.

Other objects are extreme simplicity and economy of construction, and efficiency and dependability of operation.

With these objects in view as well as other objects which will appear in the course of the specification, reference will be had to the accompanying drawing, wherein:

FIG. 1 is an outside face view of a carrier embodying the present invention, shown laid out in a generally planar position, FIG. 2 is a side elevational view of the carrier in operative position carrying a bundle of tobacco plants, and FIG. 3 is an enlarged fragmentary sectional view, taken on line III—III of FIG. 1, of the carrier in operative position.

Like reference numerals apply to similar parts throughout the several views, and the numeral 2 applies generally to the carrier forming the subject matter of the present invention. Said carrier includes a body member 4 comprising a rectangular sheet of canvas or duck or any other suitable textile fabric, stoutly hemmed along all of its edges, particularly its shorter edges. Securely stitched to the outer surface of said body member are a pair of straps 6, formed of the same material as body member 4. Each strap is arranged in substantially U-form, the closed end portion of each extending outwardly beyond one of the shorter edges of the body member to form a handle loop 8, while the leg portions 10 of each strap extend divergently toward the transverse midline of the body member, terminating closely adjacent said midline. The straps are disposed symmetrically with respect to the longitudinal midline of the body member.

Adjacent each corner of the body member, a reinforcing strap 12 of canvas or the like is folded around the shorter edge of said body member, and is firmly stitched thereto. A metal grommet 14 is set in each portion of the body member reinforced by a strap 12, adjacent the corresponding shorter edge of said body member. A wire hook 16 is carried by each of the two grommets 14 at one end of the body member, each hook having an eye 18 at one end which is permanently engaged in the associated grommet, and an open reentrant bight portion 20 at its opposite end. Said bight portion opens toward the outer surface of the body member, and is engageable in the corresponding grommet at the opposite end of the body member, as best shown in FIG. 3.

In use, body member 4 is laid out flat with its inner surface up, or inverted from the position shown in FIG. 1, and tobacco plants 22 are laid thereacross with their stems extending transversely of the body member. The shorter edges of the body member are then lifted and brought together above the bundle of plants, as shown in FIG. 2, and secured by engaging the bights 20 of hooks 16 in the grommets 14 at the opposite end of the body member. This also brings handle loops 8 into side-by-side relationship as shown in FIG. 2 so that they may conveniently be grasped for carrying the bundle about as may be required. Also, since the carrier is secured about the plants by hooks 16, the bundle may be set down and left unattended with no danger of spilling the plants. The leg portions 10 of the handle straps 6 serve to reinforce the carrier body member from folding or buckling as it is carried. During the actual planting, the carrier is supported either on the lap of the operator as he rides a suitable conveyance moving slowly along prepared rows in the field, or a suitable shallow box or other holder mounted on the conveyance, hooks 16 of course being disengaged at this time to provide access to the plants. The soft pliable nature of the carrier permits it to be carried comfortably in the lap, or to conform readily to the contours of any holder in which it may be supported. The outward opening of hooks 16 prevents them from becoming fouled or caught in the plants themselves, either during loading of the carrier with plants, or as the hooks are released to open the carrier.

While I have shown and described a specific embodiment of my invention, it will be readily apparent that many minor changes of structure and operation could be made without departing from the spirit of the invention.

What I claim as new and desire to protect by Letters Patent is:

1. A carrier for tobacco plants comprising:
   a. a rectangular sheet of pliable fabric adapted to be wrapped about a bundle of tobacco plants in a direction parallel to its major axis, and being stoutly hemmed along all of its edges,
   b. a pair of handles each comprising the loop end portion of a generally U-shaped strap of pliable fabric arranged symetrically to the longer edges of said sheet, said loop end portion of said strap extending outwardly beyond a shorter edge of said sheet, centrally thereof, and the leg portions of said strap extending divergently to a point adjacent the transverse midline of said sheet, and being securely fastened to said sheet along their entire lengths, said handles being brought into side-by-side cooperating relation when said sheet is wrapped about said bundle, and c. a pair of hooks mounted in one of the shorter edge portions of said sheet, respectively adjacent the ends of said shorter edge, and being releasably engagable with corresponding apertures provided therefor in the other shorter edge portion of said sheet, said hooks opening toward the outer surface of said sheet when the latter is wrapped about said bundle, said hooks and the end connections of said handle loops to said sheet being spaced at generally equal intervals along the shorter edges of said sheet.

* * * * *